United States Patent [19]
Wolf et al.

[11] 3,729,064
[45] Apr. 24, 1973

[54] MACHINE TOOL

[75] Inventors: Heinz K. Wolf, Willoughby Hills; Alan G. Alexander, Mentor, both of Ohio

[73] Assignee: The New Britain Machine Company, Cleveland, Ohio

[22] Filed: Jan. 18, 1971

[21] Appl. No.: 107,330

Related U.S. Application Data

[62] Division of Ser. No. 734,105, June 3, 1968, Pat. No. 3,555,962.

[52] U.S. Cl. ............184/6.14, 165/34, 165/63, 184/6.22, 184/104 R, 236/12 R
[51] Int. Cl. ...............................................F01m 5/00
[58] Field of Search .............184/6.14, 6.22, 104 R; 165/34, 35, 36; 236/12 R, 12 A

[56] References Cited

UNITED STATES PATENTS

| | | | |
|---|---|---|---|
| 2,606,747 | 8/1952 | Williams | 184/104 R |
| 2,107,188 | 2/1938 | Ryder et al. | 184/104 R |
| 2,134,778 | 11/1938 | Clarke | 165/35 X |
| 2,166,940 | 7/1939 | Conradson | 165/36 X |
| 2,245,105 | 6/1941 | Johnson | 184/6.14 |
| 2,383,878 | 8/1945 | Miller | 165/36 X |
| 2,419,630 | 4/1947 | Cruzan et al. | 165/35 UX |
| 2,524,043 | 8/1950 | Daugherty | 184/6.22 |
| 3,286,791 | 11/1966 | Cofer et al. | 184/104 R |

*Primary Examiner*—William F. O'Dea
*Assistant Examiner*—Peter D. Ferguson
*Attorney*—Joseph R. Spalla

[57] ABSTRACT

A machine tool having a power driven rotatable tool spindle and an oil distribution and lubrication system for supplying oil to the bearings and tool spindle and preferably stabilizing the bearings, spindle and spindle housing at a predetermined operating temperature range.

5 Claims, 8 Drawing Figures

Patented April 24, 1973

INVENTORS
HEINZ K. WOLF
ALAN G. ALEXANDER

BY David Lley

ATTORNEYS.

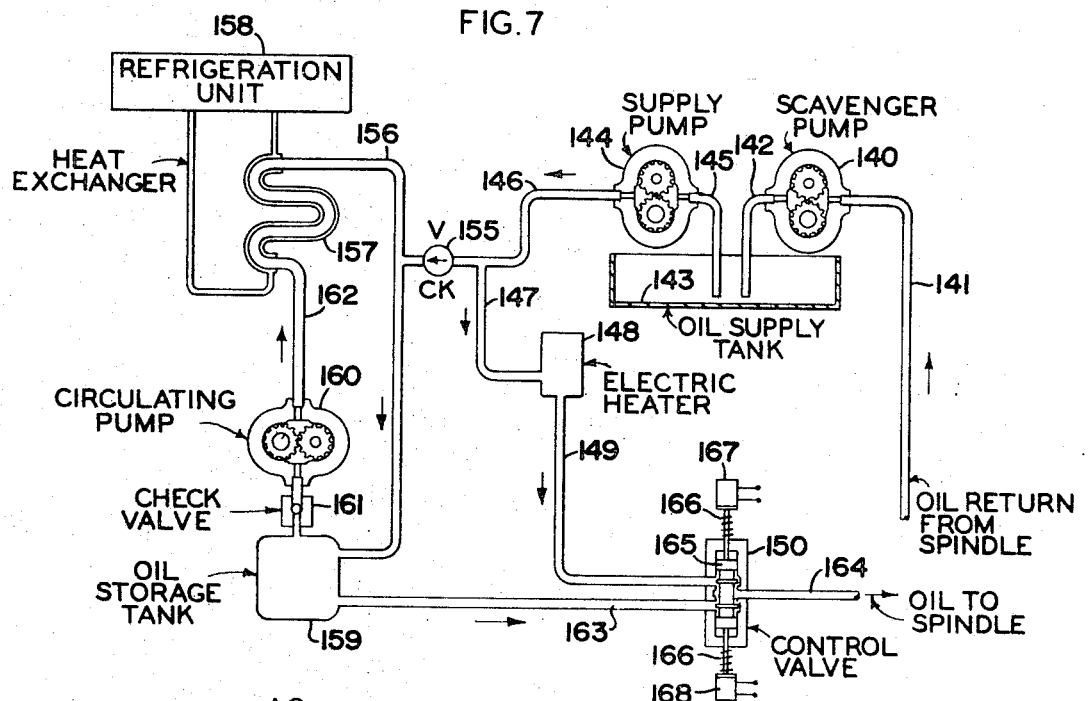
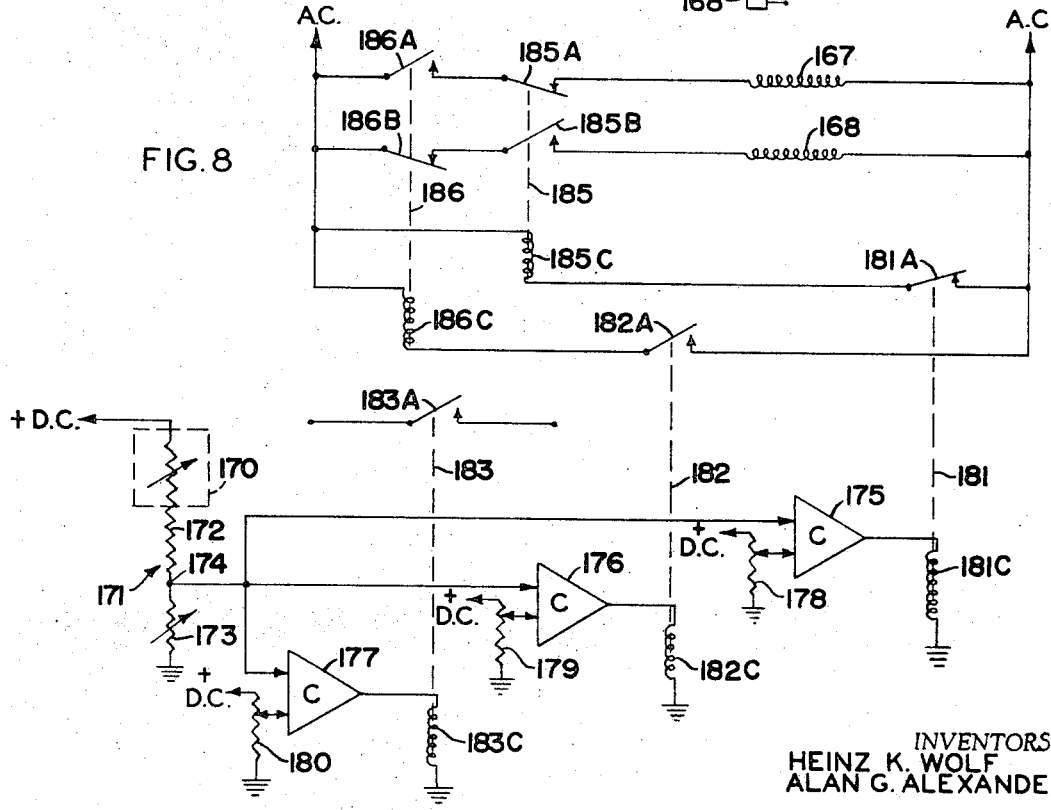

ional sides of said bed A.

MACHINE TOOL

CROSS-REFERENCE TO RELATED APPLICATION

This application is a divisional of application Ser. No. 734,105, filed June 3, 1968, and now U. S. Pat. No. 3,555,962.

BACKGROUND OF THE INVENTION

The present invention relates generally to machine tools, and more specifically to machine tools having power driven tool spindles supported by bearings for rotation at varying speeds to perform machining operations.

The accuracy of machining operations performed by machine tools of the type referred to above is, in part, dependent upon the stability of the axis of rotation of the spindle. While the spindle bearings of machine tools are normally adjustable to maintain spindle accuracy during operation, the heat generated by the bearings and the driving gears etc., can cause dimensional changes in the spindle bearings, spindle and/or spindle housing etc. resulting in inaccuracies of machining operations. Heretofore efforts have been made to stabilize the spindle axis of such machines by the circulation of the oil to remove the heat generated by rotation of the spindle etc.

SUMMARY OF THE INVENTION

An object of the present invention is the provision of a novel and improved machine tool having a power driven tool spindle and an oil distribution and lubrication system for supplying temperature controlled oil or other liquid to the spindle in order to stabilize the temperature of the bearings, spindle and spindle housing in a predetermined operating temperature range and thereby achieve spindle accuracy under all conditions of operation.

A further object of the present invention is the provision of a novel and improved machine tool having a power driven tool spindle and means for circulation oil or other liquid through at least a part of the spindle for stabilizing the temperature of the tool spindle and its bearings in a predetermined operating temperature range and thereby achieving spindle accuracy under varying conditions of operation.

A further object of the present invention is to provide a machine tool including a spindle assembly having a power driven tool spindle and bearing means mounting the spindle for rotation, with liquid passageway means in the spindle assembly and inlet and outlet means connected to passageway means in the spindle at locations spaced axially of the spindle, whereby oil or other liquid can circulate through the passageway means in the spindle during rotation of the spindle.

Still another object of the present invention is to provide a machine tool having a spindle assembly including a power driven tool spindle and bearing means mounting the spindle for rotation, with liquid passageway means extending at least partially through the spindle assembly and having inlet and outlet means connected to passageway means in the spindle for circulating oil or other liquid through the spindle during rotation of the spindle, and means for circulating and spraying oil onto the bearing means.

Another object of the present invention is to provide in combination a machine tool including a spindle assembly having a power driven tool spindle and bearing means supporting the spindle for rotation, means for supplying a temperature controlled oil or other liquid to the spindle assembly during rotation of the spindle, and heat responsive means mounted in the spindle assembly for controlling the temperature and/or quantity of the liquid supplied to the spindle assembly.

The present invention further provides in combination a machine tool including a spindle assembly having a tool spindle and bearings supporting the tool for rotation, means for supplying temperature controlled oil or other liquid to the spindle assembly and including liquid heating means, liquid cooling means, and control valve means connected between the spindle assembly and the heating and cooling means, the control valve means being operable in response to the temperature of the spindle and spindle bearings to selectively pass liquid from the heating and cooling means to the spindle assembly and/or to pass a mixture of heated and cooled liquid to the spindle assembly, thereby to maintain the temperature of the spindle and spindle bearings in a constant temperature range.

The present invention resides in certain novel constructions and arrangements of parts, and further objects and advantages will appear from the following description of the preferred embodiment described with reference to the accompanying drawings, which form a part of the specification and in which like reference characters designate corresponding parts throughout the several views.

DESCRIPTION OF THE DRAWINGS

FIG. 7 is a view diagrammatically illustrating a hydraulic circuit forming part of the oil distribution system of the machine; and FIG. 8 is an electrical circuit diagram illustrating the electrical controls associated with the oil distribution system.

DESCRIPTION OF THE PREFERRED EMBODIMENT

Figure 1:
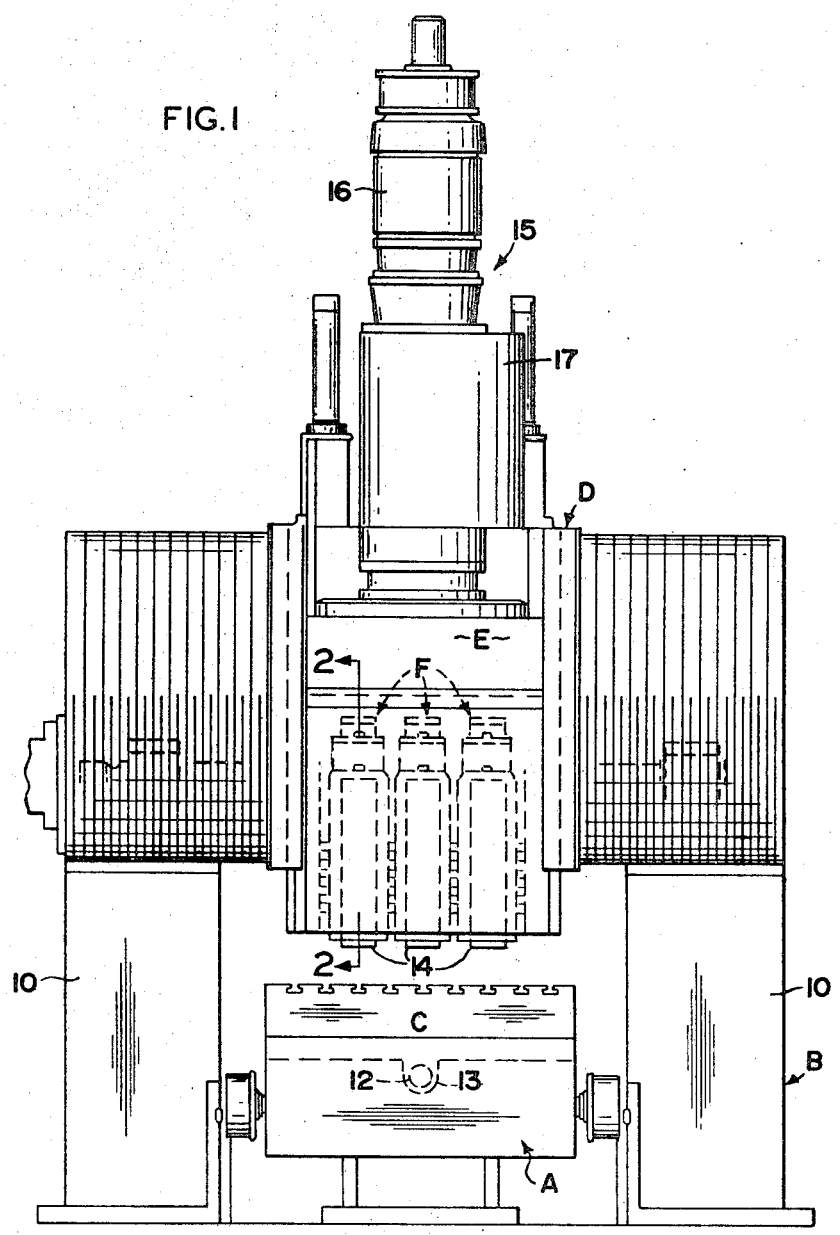
FIG. 1 is a front elevational view of the vertical milling machine embodying the present invention.

Referring to the drawings, and to FIG. 1 in particular, there is shown a vertical milling machine having a construction which is described in more detail in the copending application of Wilbur E. Meinke, Ser. No. 564,122, for MACHINE TOOL, filed July 11, 1966, now U.S. Pat. No. 3,393,426, and assigned to the same assignee as the present application. The illustrated machine is generally comprised of an elongated bed A and a rail support B including a pair of horizontally spaced, vertically extending columns 10 adjacent to opposite sides of the bed A. The bed A slidably supports a work support or table C for horizontal linear movement in opposite directions longitudinally thereof between the columns 10 of the rail support B. The table C is adapted to be linearly moved in opposite directions relative to the bed A by a lead screw 12 which has its opposite ends rotatably supported within the bed A and which is threadedly engaged with a nut 13 carried on the underside of the table C. The lead screw 12 is adapted to be rotated in opposite directions by a suitable reversible hydraulic motor (not shown) operatively connected with one end thereof.

The columns 10 support a horizontally disposed rail on which a saddle D is slidably supported for horizontal linear movement in opposite directions transversely to the direction of movement of the table C. The saddle D in turn slidably supports a spindle slide E for vertical linear movement in opposite directions relative thereto toward and away from the bed A. The spindle slide E slidably supports a plurality of spindle assemblies F for vertical movement relative thereto. The spindle assemblies F may be connected to the spindle slide E for individual adjustable movement independently of one another in a vertical direction relative to the spindle slide. Each of the spindle assemblies F includes a rotatable tool spindle 14 to which a suitable tool can be attached for performing a machining operation on a workpiece or workpieces carried by the table C. The tool spindles 14 of each of the spindle assemblies F are adapted to be rotated at various rates of speed by a drive assembly generally designated by reference numeral 15. The drive assembly 15 includes a reversible electric motor 16 operatively connected with any suitable or conventional change speed gear transmission 17, for example, a change speed planetary gear transmission. The drive assembly 15 further includes an output shaft (not shown) suitably geared to vertically disposed shafts (also not shown) which are drivingly connected to the tool spindles 14, all as disclosed in the above-identified copending application.

It is to be understood that the present invention is not limited to the vertical milling machine illustrated or to milling machines generally and that the illustrated machine has been chosen only for the purposes of describing to those skilled in the art one embodiment of the present invention. As will be apparent from the following detailed disclosure, the present invention is equally applicable to other kinds or types of machine tools having one or more rotatable tool spindles, for example, horizontal boring, milling and drilling machines.

Each of the spindle assemblies F of the illustrated machine tool is similar in construction and therefore only one of the assemblies is herein illustrated and described in detail. Referring particularly to FIGS. 2 through 6, the illustrated spindle assembly F is of commercial construction except for the oil distribution system therefor, and is comprised of a housing 25 in which the spindle 14 is mounted for rotation. A wide face spindle gear 26 is fixed to the spindle 14 and is adapted to be meshingly engaged with a spur gear (not shown) fixed to a vertical shaft (also not shown) which is journaled in the spindle slide E and forms part of the drive assembly 15. The spindle housing 25 has a suitable vertically extending opening 27 through which the driving spur gear which meshes with the gear 26 projects.

The spindle 14 is mounted for rotation within the housing 25 by upper double roller bearings 28 near the upper end of the spindle, a lower tapered roller bearing 29 near the lower end of the spindle, and a tapered roller bearing 30 spaced above the bearing 29. Suitable adjustment is provided for the roller bearing 28 by an assembly including a lock nut 31 threaded on the upper end of the spindle 14 and a spacer ring 32 interposed between the lock nut 31 and the upper end of the inner race of the bearing 28. The lock nut 31 is adapted to be secured in an axially adjusted position on the spindle 14 by means of a key 33 and a cooperating set screw 34. The bearing 29 and the bearing 30 are separated by a cup adapter or spacer 35, and both bearings may be adjusted by an assembly including a sleeve 36 pinned to the spindle 14, a nut 37 threaded on the sleeve 36, and a spacer 38 engaged between the lower end of the nut 37 and the upper end of the inner race of the bearing 30. The nut 37 may be secured in an axially adjusted position by means of a key 39 and a cooperating set screw 40. The lower end of the inner race of the bearing 29 buts against an external annular shoulder on the spindle 14 adjacent to its lower end.

A tool securing mechanism 50 of a type more specifically disclosed in U.S. Pat. No. 2,860,547 to Hallis N. Stephan is employed within the tool spindle 14 for releasably binding or locking a tool arbor (not shown) in a tapered socket 51 at the forward or lower end of the spindle 14. The mechanism 50, which does not form a part of the present invention, is comprised of a sleeve assembly including the sleeves 52, 53 and 54 fixedly mounted within the bore of the spindle 14, a drawback collet 55, and a two part ejector 56, 57 (FIG. 6) secured to the front or lower end of an operating rod or bar 58. The operating rod or bar 58 is reciprocal within the spindle 14 including the sleeve assembly 52, 53, 54. The collet 55 includes a plurality of spring or resilient fingers (not shown) each having a wedge-shaped outer and inner end portion cooperable with inner inclined surfaces of the sleeve or bushing 52 mounted adjacent the lower end of the sleeve 53 and a frusto-conical wedge surface on the end of the tool arbor (not shown) for binding or locking the tool arbor in the spindle socket 51.

The collet 55 is continuously urged to a retracted or wedging position by compression washers 59 engaged between the upper end of the sleeve 54 and a spacer 58a on the upper end of the operating bar 58. The sleeve 54 is threaded into the sleeve 53 and provides means for adjusting the pre-load of the washers 59. The collet 55 of the mechanism 50 is movable forwardly or downwardly with respect to the spindle 14 from its rearward locking position to a forward release and ejecting position by structure including a piston 60 having a head which is reciprocal in a cylinder cap 61 connected to the upper end of the spindle housing 25. As shown, the piston 60 includes the downwardly projecting, tubular portion 62 which slidably extends through a plate 63 mounted between the cylinder cap 61 and a member 64 secured to the upper end of the spindle housing 25. The lower end of the tubular portion 62 of the piston 60 is slidably received in a rod or bar cap 65 which is threaded on the end of the operating rod or bar 58 and is longitudinally slidable in a rod cap retainer 66 fixed to the upper end of the spindle 14. When the piston 60 is moved downwardly, a shoulder 67 of the tubular portion 62 is brought into engagement with the outer end surface of the cap 65 to force the cap and the connected rod or bar 58 downwardly and thereby move the collet 55 to its release position and the ejector to its ejecting position. Fluid pressure for moving the piston 60 in a downward direction is supplied to the cylinder cap 61 above the piston by a fluid pressure supply line 68. As shown, a spring 69 may be mounted between the head of the piston 60 and the upper surface of the plate 63 for urging the piston toward the closed upper end of the cylinder cap 61.

Figure 2:
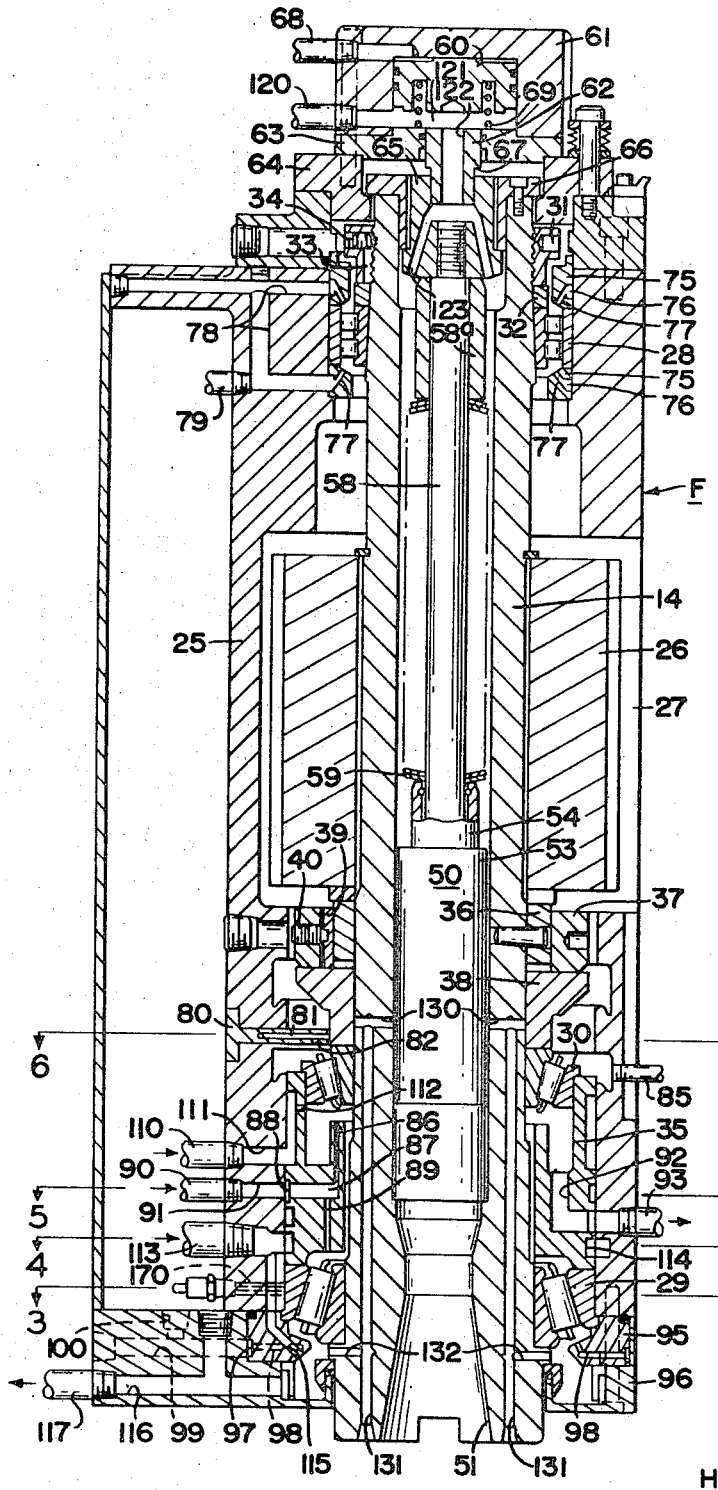
FIG. 2 is an enlarged, cross-sectional view taken approximately on the line 2—2 of FIG. 1.
Figure 6:
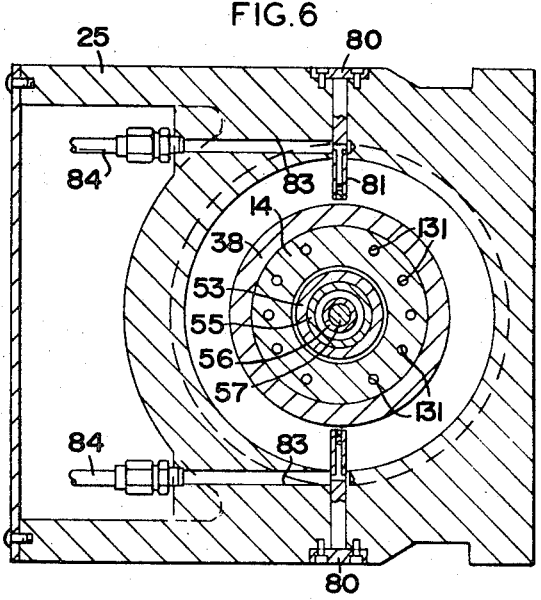
FIG. 6 is a cross-sectional view taken approximately on the line 6—6 of FIG. 2.

The oil distribution system for the illustrated spindle assembly F includes provision for delivering oil to each side of each of the bearings 28, 29, 30 through jets which are directed at the rollers. As shown in FIG. 2, the upper bearing 28 is mounted between spray rings 75 each of which has a peripheral groove 76 and communicating jet spray passages 77 directed toward the rollers of the bearing 28. Oil is supplied to the spray rings 75 through passages 78 drilled in the spindle housing 25 in communication with the peripheral grooves 76 and with a supply pipe 79 which is connected to the housing. Oil is delivered to the upper face of the bearing 30 by a pair of injection spray tubes 80, one of which is shown 90° out of position in FIG. 2 for purposes of clarity, which are mounted in the spindle housing 25. Each of the injection tubes 80 has an axial passage 81 and an outlet jet passage 82 which is located near the inner end of the tube and is directed toward the adjacent face of the bearing 30. As shown in FIG. 6, oil passages 83 are drilled in the spindle housing 25 into communication with inlet ports formed in the tubes 80 near the outer ends of the axial passages 81. Inlet supply pipes 84 are connected to the spindle housing 25 to communicate with the spindle housing passages 83. The oil sprayed onto the bearing 30 from the tubes 80 may be exhausted through a pipe 85, shown out of position in FIG. 2, connected to the spindle housing 25 to communicate with the annular space surrounding the spacer 38.

Oil is supplied to the lower face of the bearing 30 and to the upper face of the bearing 29 through the cup adapter 35. The cup adapter 35 is formed with jet passages 86 which are directed toward the lower face of the bearing 30 and communicate with a plurality of radial passages 87 extending from a peripheral groove 88 formed in the side wall of the cup adapter 35. Another series of jet passages 89 extend from the radial passages 87 in a direction opposite to the jet passages 86 toward the upper face of the bearing 29. An oil inlet pipe 90 is connected to the spindle housing 25 in communication with a passage 91 extending inwardly to the peripheral groove 88 of the cup adapter 35. An outlet for the oil supplied to the lower face of the bearing 30 is provided by a plurality of passages 92, one of which is shown out of position in FIG. 2, which extend from the upper end of the cup adapter 35 to a circumferential groove formed in the side wall thereof and communicate with a passage drilled in the spindle housing 25 and an outlet pipe 93 also shown out of position in FIG. 2. The lower face of the bearing 29 is lubricated by means of a bearing retainer and spray ring 95 mounted between the lower end of the spindle housing 25 and a spindle housing end cover 96. The bearing retainer and spray ring 95 has a circumferential groove 97 and jet passages 98 which communicate with the groove and are directed toward the lower face of the bearing 29. Oil is supplied to the circumferential groove 97 of the bearing retainer and spray ring 95 through a passage 99 drilled in the end cover 96 and an inlet port 100 which communicates with the passage 99 and is adapted to be connected to an inlet pipe (not shown). The jet passages of the spray rings 30 and 95, the injection tubes 80, and of the cup adapter 35 are all of a size to deliver the proper amount of oil for maximum efficiency and to avoid delivering an excess of oil which could create excessive heat due to oil shear friction.

In accordance with the present invention additional oil is supplied to the bearings 29 and 30 through a supply pipe 110 connected to the spindle housing 25 in communication with a passage 111 drilled therein. The oil delivered to the spindle housing passage 111 is free to circulate around the cup adapter 35 and to drain through a passage 112 in the side wall of the cup adapter into the outlet passages 92 and the communicating pipe 93.

Figure 4:
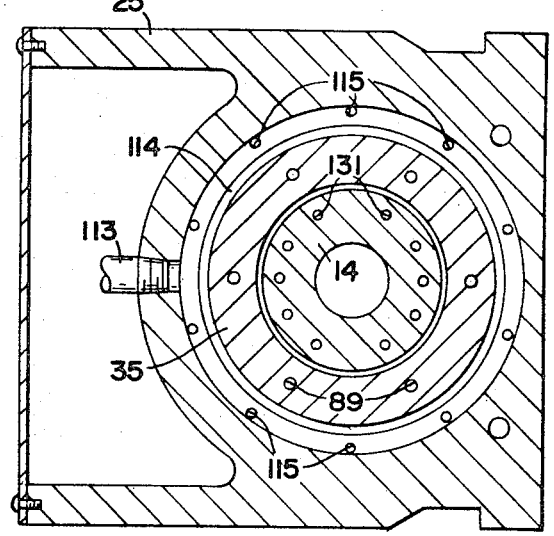
FIG. 4 is a cross-sectional view taken approximately on the line 4—4 of FIG. 2.
Figure 5:
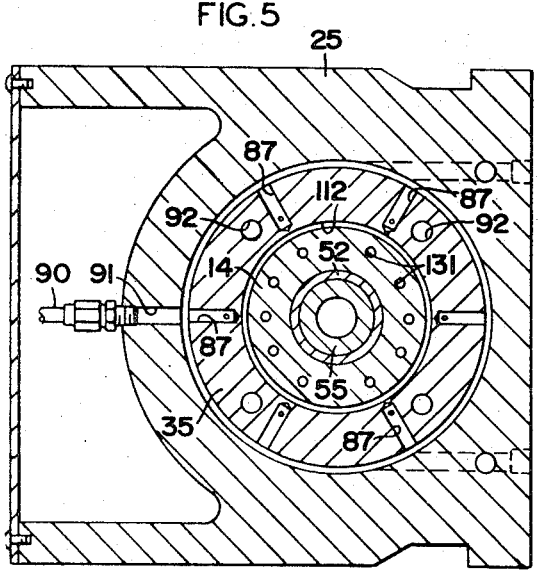
FIG. 5 is a cross-sectional view taken approximately on the line 5—5 of FIG. 2.

As shown in FIGS. 2 and 4, another oil inlet pipe 113 is connected to the spindle housing 25 for supplying oil to a groove 114 formed in the outer peripheral surface of the cup adapter 35 and to a plurality of passages 115 which are drilled through the lower end portion of the spindle housing adjacent the outer surface of the bearing 29 and open in the inside of the spindle housing end cover 96. The oil which circulates to the inside of the spindle end cover 96 is discharged through a passage 116 formed therein and a communicating outlet pipe 117 connected to the spindle end cover.

In addition to the oil delivered to the bearings 28, 29, 30, the invention also provides for the circulation of oil through the spindle 14. To this end, an oil inlet pipe 120 (FIG. 2) is connected to the cylinder end cap 61 for delivering oil to the inside of the cylinder end cap beneath the head of the piston 60. The tubular end portion 62 of the piston has a lateral, through passage 121 which intersects an axially extending passage 122 that is open at the lower end of the tubular portion. The rod cap 65 is formed with passages 123 which extend from the bottom of the tubular end portion 62 to the lower face of the rod cap, thereby permitting the oil supplied by the pipe 120 to flow into the upper end of the bore of the spindle 14 around the spacer 58a and down around the washers 59, the upper end of the sleeves 53 and 54 to the inner end of radial passages 130 in the spindle 14. From the radial passages 130 the oil flows down through a plurality of circumferentially spaced, axially extending passages 131 drilled in the spindle 14 from its lower or tool supporting end. The outer or lower ends of the passages 131 are plugged and the inner or upper end of each passage communicates with a radial passage 130 which passages communicate with the spindle bore at a location just above the bearing 30. The passages 131 are connected to the inside of the spindle housing end cover 96 by radial passages 132 drilled in the spindle 14 through its outer wall. In the illustrated constriction, the bore of the spindle 14 and the passages 130, 131, 132 define oil passageways extending through the spindle 14 from its upper end to the lower part of the spindle adjacent to the bearings 29, 30, whereby oil supplied to the upper end of the spindle bore passes therethrough to the end cover 96 where the oil is then discharged through the spindle housing passage 116 and the outlet pipe 117. It will be seen that the oil in the passages 131 flows axially through the lower end of the spindle adjacent both of the bearings 29, 30 which support the major part of the load on the spindle, and that the disclosed construction is therefore particularly efficient in enabling the heat generated by the bearings in a machining operation to be removed.

As generally described above, the oil which is supplied to the bearings 28, 29, 30 and which is circulated through the spindle 14 not only lubricates the bearings but is preferably temperature controlled in order to stabilize the temperature of the spindle and the various parts of the spindle bearings within a predetermined operating temperature range. The hydraulic system for supplying the temperature controlled oil to the spindle assembly is shown in FIG. 7 as comprising a scavenger pump 140 having its inlet side suitably connected by an oil return hose or line 141 to the outlets 85, 93 and 117 of the spindle assembly F. The outlet side of the scavenger pump 140 is connected by a hose or line 142 to an oil supply tank or reservoir 143. A supply pump 144 which has its inlet side connected to the tank 143 by a line 145 delivers oil through a line 146 and a connecting line 147 to an electric resistance heater 148. The oil which is heated in the electric resistance heater 148 is delivered through a line 149 to a supply control valve 150.

The outlet line 146 from the supply pump 144 is also connected through a check valve 155 to The cold oil 156 of a suitable heat exchanger 157 which may be a conventional freon-to-oil heat exchange unit or the like connected to a refrigeration unit 158. As shown in FIG. 7, the outlet line 156 of the heat exchanger 157 communicates with a closed oil storage tank 159 in which a supply of cold oil is maintained. An oil circulating pump 160 draws oil out of the tank 159 through a check valve 161 and delivers the oil through a line 162 to the heat exchanger from which it returns to the tank 159 through the hose 156. The cold oil from the tank 159 is delivered to the control valve 150 through a line 163.

The supply control valve 150 is a double solenoid operated, spring-centered, hydraulic valve. Two ports of the valve are connected to the lines 149, 163 and a third port of the valve is connected to an outlet line 164, which communicates with the oil inlet means 79, 84, 90, 100, 110, 113 and 120 of the spindle assembly F. The valving member 165 of the valve 150 is urged to a center position by springs 166 wherein the lines 149 and 163 are communicated with the outlet supply line 164 to provide a mixture of heated and cooled oil. The valving member 165 is adapted to be moved upwardly, as viewed in FIG. 7, by energization of a low temperature solenoid 167 to close the line 163 and to communicate the line 149 with the line 164 and thereby deliver only warm oil to the spindle assembly F. Energization of a high temperature solenoid 168 serves to move the valving member 165 downwardly, as viewed in FIG. 7, to close the line 149 and to communicate the line 163 with the line 164 and thereby deliver only cool oil to the spindle assembly.

Figure 3:
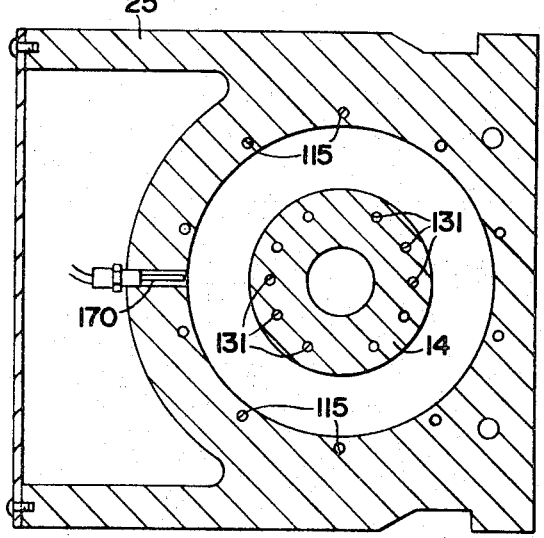
FIG. 3 is a cross-sectional view taken approximately on the line 3—3 of FIG. 2.

In the illustrated embodiment of the invention, the operation of the supply control valve 150 is controlled in response to the heat generated in the area of the spindle assembly bearing 29. As shown in FIGS. 2 and 3, a thermister 170 or other suitable heat detection and responsive means, is mounted in the spindle housing 25 adjacent the bearing 29. As is well known in the art, a thermister is a semi-conductor that has a high negative temperature coefficient of resistance, so that its resistance decreases as its temperature rises.

Reference is now made to FIG. 8 which schematically shows the electrical circuitry for controlling operation of the low temperature solenoid 167 and the high temperature solenoid 168 of the valve 150 in response to temperature changes of the spindle assembly F detected by the thermister 170. As shown, the thermister 170 is connected as one element of a voltage divider 171, which also comprises a fixed resistor 172 and a variable resistor 173. All of the elements comprising the voltage divider 171 are connected in series in conventional fashion, and the voltage divider is connected between a constant D.C. voltage source (not shown) and ground. As the resistance of the thermister 170 varies in response to temperature variations, the voltages appearing at a point 174 between the resistors 172, 173, in the voltage divider will also vary. Specifically, as the temperature of the thermister 170 rises and its resistance decreases, the voltage at the point 174 rises, and vice versa.

The control circuitry also includes three threshold devices or voltage comparators 175, 176, 177. The comparators 175, 176, 177 may be of conventional type, such as the well-known Schmidt trigger circuit, which compares the amplitudes of two input voltages and provides an output when one of the voltage amplitudes exceeds the other. A comparison voltage is provided to one input of the comparator 175 from a variable source of potential, such as from the adjustable area of a potentiometer 178 connected between the D.C. source and ground. Comparison voltage inputs are similarly respectively provided to the comparators 176, 177 from potentiometers 179, 180. It is understood that the potentiometers 178, 179, 180 are shown in a diagrammatic sense only, and the comparison voltage inputs to the comparators may be from taps on a single voltage divider or from any other suitable source of variable, predetermined voltages. The comparator 175 (high temperature comparator) the comparator 176 (low temperature comparator), and the comparator 177 (shut-down comparator) each receives a variable second input signal which is provided from the juncture point 174 in the voltage divider 171. The potential supplied to the high temperature comparator 175 from the potentiometer 178 is so adjusted that the comparator 175 provides an output signal when its second input signal indicates that the temperature of the thermister 170 is below a predetermined high temperature value, that is, when the amplitude of its variable input signal is less than that of its comparison input signal. Similarly, the signal supplied from the potentiometer 179 to the low temperature comparator 176 is adjusted so that the comparator will provide an output signal when the temperature of the thermister 170 is below a predetermined low temperature level. The potential supplied from the potentiometer 180 to the shut-down comparator 177 is such that the comparator will provide an output signal until the variable second signal provided to it indicates that the temperature of the thermister 170 has reached a dangerously high temperature level.

The outputs of the comparators 175, 176, 177 respectively control the operation of a high temperature relay 181, a low temperature relay 182, and a shutdown relay 183. The outputs of the comparators 175, 176, 177 are connected to energize relay actuating coils 181C, 182C, 183C, respectively. The relays 181, 182, 183 have contact sections 181A, 182A, 183A, respectively. The relay contact sections are shown in their normal positions when their actuating coils are de-energized; that is, the contacts 181A are closed, the contacts 182A are open, and the contacts 183A are open. It is pointed out that the relay coil 182C will be de-energized when the thermister temperature is above the low temperature level, and the relay coil 181C is de-energized when the temperature is above the high level. Of course, both coils 181C, 182C are de-energized when the equipment is shut down.

Direct control of the low temperature and high temperature solenoids 167, 168 is provided by a relay 185 having contact sections 185A, 185B and an actuating coil 185C, and by a relay 186 having contact sections 186A, 186B, and an actuating coil 186C. The relay contact sections are conventionally shown in their positions when their actuating coils are de-energized. This, of course, occurs only when the relay coil 181C is energized and the relay coil 182C is de-energized. The relay actuating coil 185C is connected across an A.C. voltage source (not shown) through the normally-closed relay section 181A, and the relay actuating coil 186C is similarly connected through the normally-open relay section 182A. The low temperature solenoid 167 is connected across the A.C. source through the normally-closed relay section 185A and the normally-open relay relay section 186A in series. The high temperature solenoid 168 is similarly connected through the normally-open relay section 185B and the normally-closed relay section 186B.

The normally-open contact section 183A of the shut-down relay 183 may be connected in the primary power supply (not shown) for the entire machine. When the temperature of the thermister 170 has reached a dangerously high level and the output signal from the shut-down comparator 177 ceases, the relay section 183A will open to shut down the entire machine.

When the temperature of the oil in the spindle assembly F (and hence the temperature of the thermister 170) is below a predetermined low temperature value, the comparators 175, 176, 177 provide output signals to energize the relay actuating coils 181C, 182C, 183C, respectively. Thus, the relay section 181A will be open, and the relay section 182A will be closed. Of course, the relay section 183A will be closed so that primary power is applied to the equipment. When the relay coil 181C is energized and the relay section 181A is open, the relay coil 185C will be de-energized and the sections 185A, 185B will be in the positions shown. When the relay coil 182C is energized and the relay section 182A is closed, the relay coil 186C is energized. This causes the relay section 186A to close and the section 186B to open. Thus, the relay sections 185A, 186A are both closed and the low temperature solenoid 167 is energized. At that time, the relay sections 185B, 186B are both open and the high temperature solenoid 168 is de-energized. Therefore, as seen in FIG. 7, valving member 165 of the valve 150 will move upwardly to increase the supply of warm oil from the heater 148 through the pipe 149 to the spindle assembly, and close off the supply of cold oil from the pipe 163.

When the oil supplied to the spindle assembly has reached the predetermined low temperature level, for example, 85° F., the output signal from the low temperature comparator 176 ceases and the relay coil 182C is de-energized. When this occurs, the section 182A opens and the relay coil 186C is de-energized. At this time, the relay coil 181C is still energized so that the relay sections 185A, 185B are in the positions shown. Thus, the relay section 185A is closed but the relay section 186A is open, so that the low temperature solenoid 167 is de-energized. Similarly, the relay section 185B is open and the section 186B is closed so that the high temperature solenoid 168 is de-energized. Thus, the valving member 165 (FIG. 7) will be centered by the springs 166 to provide both warm and cold oil simultaneously to the spindle.

When the oil supplied to the spindle assembly has reached a predetermined high temperature level of, for example, 95° F., the output signal from the high temperature comparator 175 ceases. Of course, at this time there is no output from the low temperature comparator 176, and so both relay actuating coils 181C, 182C are de-energized. The relay section 181A is closed to energize the relay actuating coil 185C, and the relay section 182A is opened to maintain the relay coil 186C de-energized. Under these conditions, the relay section 185A opens and the relay section 185B closes; the relay section 186A is open and the relay section 186B is closed. When the relay section 185A is open and the section 186A is open, the low temperature solenoid 167 is de-energized. At this time, however, the relay section 185B is closed, as is the relay section 186B. Therefore, the high temperature solenoid 168 will be energized. This causes the valving member 165 to move downwardly (as seen in FIG. 7) to cut off the supply of hot oil to the spindle and to provide more cold oil from the pipe 163 through the valve 150 to the pipe 164 and hence to the spindle assembly.

It is apparent that as the temperature of the oil supplied to the spindle assembly falls, the sequence of relay operations previously described will be reversed. It is pointed out, however, that as the temperature decreases, the various transition points at which signals are provided from the comparators 175, 176, 177 may vary from the transition points realized when the temperature is increasing. These variations will be relatively minor, and in general will not exceed approximately 5° F.

Summarizing the operation of the control circuit briefly, it is now seen that the low temperature solenoid 167 is energized to provide an increased supply of warm oil when the temperature of the oil supplied to the spindle assembly is below a predetermined value such, for example, as 85° F. When the temperature of the oil exceeds that value, both the low and high temperature solenoids 167, 168 are de-energized, and both hot and cold oil will be supplied until the temperature of the oil reaches approximately 95° F. Above that temperature, the high temperature solenoid 168 is energized to provide cold oil to reduce the oil temperature. If by any chance, due to malfunction of the apparatus, the temperature of the spindle assembly oil should reach a dangerous high level, the output signal from the shut-down comparator 177 will cease. This will cause the relay section 183 to open and remove primary power from the equipment. This so-called shut-down temperature would normally be preset at approximately 140° F. If the equipment has been shut down due to excessive oil temperature, the relay coil 183C will again be energized to provide primary power through the section 183A when the temperature has decreased to approximately 135° F.

It will be apparent from the foregoing that the enumerated objects and other advantages have been accomplished and that the invention provides an efficient oil lubrication and cooling system for the spindle assembly of a machine tool. In the illustrated and described embodiment, the invention has provided a spindle assembly of a machine tool characterized by liquid passageway means extending at least partially through the spindle between its ends, whereby oil can be circulated through the passageway means to remove heat before it can transfer to other parts of the machine tool. It will be further apparent that the invention has provided a machine tool having a rotatable spindle supported by bearings, and means for supplying temperature controlled oil to the bearings and/or the spindle, the temperature of the supplied oil being preferably controlled in response to the temperature developed in the spindle assembly during rotation of the spindle. While the valve for controlling the supply of temperature controlled oil to the spindle has been disclosed as being operative in two positions to supply either warm or cold oil in another position to supply a mixture of the two, it will be apparent that a suitable valve and controls can be employed to provide a variable mixture of warm and cold oil and/or to control the quantity of oil flowing to the spindle.

Although the machine tool and the oil distribution and lubrication system of the present invention has been illustrated and described herein to a detailed extent, it will be understood, of course, that the invention is not to be regarded as being limited correspondingly in scope but that it includes all changes and modifications coming within the terms of the claims hereof.

What is claimed is:
1. In combination, a machine tool comprising
    a rotatable tool spindle including a tool engaging end and an opposite end,
    first and second bearing means for supporting said tool engaging and opposite tool spindle ends,
    said spindle including a longitudinally extending liquid passage means extending through said spindle means adjacent to at least one of said first and second bearing means,
    liquid inlet means communicating with one end of said longitudinally extending liquid passage means, and
    liquid outlet means communicating with the other end of said longitudinally extending liquid passage means, and
    means for delivering liquid to said inlet means and for receiving liquid from said outlet means during the rotation of said spindle comprising
    liquid cooling means for selectively removing heat from said liquid when the temperature of said spindle and hence the temperature of the liquid increases beyond a predetermined maximum temperature whereby heat will be transferred from said spindle directly to the liquid without first being transferred to said one bearings, and
    liquid heating means for selectively raising the temperature of said liquid when the temperature of said spindle and hence the temperature of the liquid decreases below a predetermined maximum temperature whereby heat will be directly transferred from the liquid to said spindle.

2. A combination according to claim 1, wherein said delivering and receiving means further comprises heat responsive means for controlling the selected operation of said liquid cooling means and said liquid heating means.

3. A combination according to claim 1, wherein said one bearing means comprises tapered roller bearing means.

4. A combination according to claim 3, wherein said liquid passage means further comprises means for spraying oil onto the opposite faces of said bearing means.

5. A combination according to claim 3, wherein said longitudinally extending liquid passage means further comprises an axial bore.

* * * * *